United States Patent
Bakerman et al.

(10) Patent No.: US 7,340,719 B1
(45) Date of Patent: Mar. 4, 2008

(54) METHODS AND APPARATUS TO PRESERVE SOFTWARE MODIFICATIONS

(75) Inventors: Thomas J. Bakerman, Acton, MA (US); Jefferson A. Kita, Newton, MA (US); Kristian R. Cibulskis, Cambridge, MA (US); Mark B. Hecker, Northborough, MA (US)

(73) Assignee: SUN Microsystems, Inc., Santa Clara, CA (US)

( * ) Notice: Subject to any disclaimer, the term of this patent is extended or adjusted under 35 U.S.C. 154(b) by 960 days.

(21) Appl. No.: 10/745,990

(22) Filed: Dec. 24, 2003

(51) Int. Cl.
*G06F 9/45* (2006.01)
(52) U.S. Cl. .................................................... 717/106
(58) Field of Classification Search ................ 717/106
See application file for complete search history.

(56) References Cited

U.S. PATENT DOCUMENTS 6,510,083 B1 * 1/2003 See et al. ............... 365/185.24
2002/0124243 A1 * 9/2002 Broeksteeg et al. ........ 717/168
2004/0267829 A1 * 12/2004 Hirakawa et al. ........... 707/200
2005/0055523 A1 * 3/2005 Suishu et al. ............... 711/165

* cited by examiner

*Primary Examiner*—John Chavis
(74) *Attorney, Agent, or Firm*—Chapin IP Law, LLC; Barry W. Chapin, Esq.

(57) ABSTRACT

A code generator utilizes a "generated_source" directory to store corresponding machine-generated software code. A "modified_source" directory stores user-written modifications associated with software generated by the code generator. During code generation, the code generator checks the modified_source directory for a class presently being generated by the code generator. If there are no user modifications (stored in the modified_source directory) associated with the class being processed, the code generator creates an implementation of the class. If the modified_source directory contains an implementation of the class being processed, the code generator creates an implementation of a base class for the class being processed. The base class is created in the generated_source directory, preserving the class created by the user.

34 Claims, 9 Drawing Sheets

METHODS AND APPARATUS TO PRESERVE SOFTWARE MODIFICATIONS

BACKGROUND

Development of application programs sometimes involves the use of visual modeling tools such as Rational Rose or Microsoft Visual Studio to perform a front end design analysis and then developers create a corresponding software architecture and design. The front end analysis is performed to identify and define application requirements as well as to determine functionality to be supported by an application program.

In general, application programs are developed based upon the application functionality requirements derived during the front end design analysis. For example, the developer converts a high level architecture and design derived during the front end analysis into low level design including classes, objects, relationships, inheritances, methods and attributes developed using the visual modeling tool. The low level design is then converted into corresponding metadata that defines properties of software to be generated by a code generator. Source code generators use the metadata to generate a source code for client applications. That is, based on a metadata specification, there exist conventional software code generator programs that can operate to automatically generate software code (e.g., C++ or Java source code) for use by software applications under development. A developer can then reference (e.g., inherit or otherwise include) the automatically generated source code within the code (e.g., a main program) of the software application under development. The collection of automatically generated code to the developer created code can then be compiled into an executable (i.e., machine code) program.

Modifying contents of metadata (or information that is used to generate the metadata) is one way of implementing code modifications in a corresponding client application because, for each software build (e.g., nightly), the code generator automatically generates new up-to-date software code based on the updated metadata. Another way of implementing code modifications is to directly (e.g., by hand) modify or edit the software source code generated by the code generator instead of initiating modifications to the metadata itself.

SUMMARY

Conventional techniques of generating software code suffer from certain deficiencies. One such deficiency is that conventional techniques are not well-suited for preserving user modifications to software generated by a code generator. In particular, most conventional code generators overwrite any user modifications to machine-generated code (e.g., source code generated by a code generator device such as a computer) and thus fail to take into account any user modifications on a following software code build because any user modifications are lost (i.e., overwritten). Thus, using conventional software development platforms, a developer must re-implement any user modifications to machine-generated code on a routine basis after the code generator creates the most up-to-date version. In this manner, by re-inserting user generated changes to machine generated source code after that code is generated, to the developer is able to ensure that user modifications exist in the generated code.

In the alternative, a developer can implement certain desired changes to code generated by the code generator by modifying (or initiating a change to) the metadata that the code generator uses to generate the software code. Changes to the metadata are not overwritten during the code generation process and thus not lost for each successive code build. However, restricting a developer to implement all changes by modifying the metadata may be unacceptable because, in certain cases, it may not be possible or efficient to implement appropriate changes to the machine-generated code by merely modifying metadata that the code generator uses to generate the code.

As noted above, as an alternative to modifying metadata to implement software changes, the developer may rewrite the extended or modified code (e.g., the user written portion of code or custom modifications) associated with the machine-generated code each time such software is regenerated by the code generator. Unfortunately, manually rewriting the modified portions of code into a machine-generated software file after each code build increases maintenance and development costs associated with developing the code. Manually rewriting overwritten portions (including software modifications) of code after each code build also increases the risks of introducing bugs into the code as a result of human error. Still further, if a developer relies on the ability to re-edit generated code after each build, the developer may forget to make modifications at one point and thus the resulting application may not function properly.

Certain conventional code generation mechanisms preserve user modifications associated with generated code by using a tag system. For example, special tag characters in files storing generated code delimit areas where user modifications are allowed as well as delimit other areas that will be overwritten during each build by the code generator. Thus, certain conventional methods enable user written portions of code to be preserved in a given file upon each code build. However, the conventional method of co-mingling user written code (i.e., hand written user modifications to code) in a same file or storage location (e.g, directory) as machine generated code (i.e., code generated by the code generator) complicates the code generation process. In particular, the code generator must include resources to identify user modifications in a given file and make sure that such resources are not overwritten during the code generation process. A further limitation of a tag-based system is that the source code containing both user-generated code and system-generated code may only be modified by tools that are aware of the meaning of the tags, in order to prevent the user from modifying the system-generated code.

In contrast to the above-described conventional approaches to generating software code, embodiments of the invention are well-suited for generating code while at the same time preserving a user's corresponding code modifications. For example, during the code generation process supported by this invention, a code generator assigns files of corresponding machine-generated software different file names, depending on whether a given file of machine-generated software (e.g., a class) is associated with user modifications (e.g., hand-written user modifications) provided by a developer that is stored in a separate storage area from the machine-generated software. If an associated user software file exists for code generated by the code generator in the separate storage area, the code generator assigns to the given file of machine-generated software a different but associated name, other than a name that would have been assigned if there were no associated file of user modifications.

As an example, embodiments of the invention provide a code generator that can perform periodic generation of software code classes based on metadata. During this class generation process, prior to generating a class with a given name, the code generator first checks a user modification storage location (e.g., a designated sub-directory in a file system) that contains user-modified versions of the software source code classes. If the code generator detects that a class exists in the user modification storage location, the code generator still generate the required software code, but stores it in a different storage location (e.g., a different designated sub-directory) which is reserved for generated code. In addition, the code generator generates a class with a different class name than the corresponding class that contains user modifications which is contained or stored in the user modification storage location. Thus the generated code does not overwrite the user-modified code, and each of different types of code co-exist in respective storage locations. Also, since the code generator detects the user-modified version of the code, the code generator creates a software code with a different identity (e.g., a different class name) than the software code modified by the user. The user version of the code can thus use the original name or identity of the software (e.g., the original class name) and can reference (e.g., extend) the generated version of the code via a reference to the generated code within the user modified code. As such, at compile time, there will be no conflicts of having two portions of software (e.g., two classes) having the same name (since the generated name is automatically changed from the name existing in the user modified code storage location). In addition, since the user version of the code, containing whatever additions or modification that user desires, extends or otherwise references the generated version, the functionality within both versions of the code (i.e., the user version and the generated version) is available to programs that reference just the user version of the generated code.

Further still, another example code generator configured according to embodiments of the invention can inspect or otherwise check to be sure that the user generated version of the code contains the proper reference to the generated version of the code. That is, when the code generator operates to perform code generation, if the user code storage location contains, for example, a file having a class name of code to be generated, then the code generator can assume that the user/developer has written some code to enhance or otherwise amend the functionality (i.e., the code generator assumes that the user has created some user modified code). If the user code has the same class name as the class that would have been generated (if no user version existed), then the code generator, as explained above can create a generated version of this class, but provide a name for this generated version that is different than the user version of the class that the code generator detected. Either before or after generation of this generated class, the code generator can look at the user version of the class and can check to see if the user has properly referenced the generated version (i.e., via a predetermined naming convention for user and generated version of the same class). Perhaps the user forgot to add the reference to the generated class. In such cases, this embodiment can modify the user code to contain the required proper reference (e.g., extends reference) to the generated code such that all functions in both the user modified version of the code and the automatically generated version of the code are available at compile time.

Maintaining user generated and machine-generated software files with different but associated names (e.g., different filenames, pathnames and/or locations) as well as employing an additional technique of providing references in the user generated software files (that refer to associated machine-generated software) enables the code generator and thus developers to maintain inheritance among machine-generated code and corresponding user generated code.

More particularly, an embodiment of the invention utilizes a first storage area (e.g., a first directory such as a "generated_source" directory) to store software code generated by a code generator. A second storage area (e.g., a second directory such as a "modified_source" directory) stores user modifications (e.g., user software) associated with the software generated by the code generator stored in the first storage area. During code regeneration, the code generator first checks the modified_source directory for a file with a name associated with software presently being produced by the code generator. For example, based on metadata, the code generator generates software associated with a file such as file A. If there are no user modifications stored in the modified_source directory associated with file A, the code generator stores file A with a file name and extension, namely, A.java, in the generated_source directory without changing A.java to another name. On the other hand, if the modified_source directory contains a file such as A.java (e.g., a user software file including modifications associated with file A), the code generator still generates the software code associated with file A but changes the name associated with the machine-generated software to be A_BASE.java for storage in the generated_source directory. Thus, the code generator appends a well-known or identifiable suffix (e.g., "_BASE") to the file name and places the machine-generated software (A_BASE.java) in the generated_source directory while preserving software (e.g., A.java) containing user modifications stored in the modified_source directory.

In the context of a code generator that generates classes, the code generator according to an embodiment of the invention searches for a user-written class in the modified_source directory associated with a given class (e.g., Class_Y) that the code generator is about to generate. If the code generator finds a class associated with Class_Y in the modified_source directory, the code generator generates a class but with a modified name such as Class_Y_BASE for storage in the generated_source directory. In one embodiment, the user written class (Class_Y) includes a reference so that Class_Y extends from (e.g., derives from) the generated class with the modified name (Class_Y_BASE). This ensures that a user-written class such as Class_Y in the above-example inherits from a corresponding machine-generated class (such as Class_Y_BASE). Thus, the code generator according to an embodiment of the invention can generate method interfaces, either virtual or with a default implementation, while the real implementation exists in a derived class. During subsequent regenerations of the classes, the code generator does not overwrite user modified code because the generator generates the renamed class (e.g., Class_Y_BASE), which is protected from being modified by a user. Instead, as discussed, any user modifications are provided in a separate file such as Class_Y in the modified_source directory.

Clients utilizing classes generated by the code generator instantiate classes based on use of the original file name such as Class_Y. The client application does not have to know whether that class is machine-generated or user-written because the client simply refers to Class_Y which may or may not include user modifications stored in the modified_source directory as discussed above. Accordingly, client code does not have to be rewritten when a class needs to have some user-defined implementation added to it. Such an implementation can always be added later without effecting the client application.

Accordingly, in view of the specific embodiments of the invention discussed above, a general embodiment of the invention involves use of a code generator device that utilizes a first storage area to store software generated by the code generator. As mentioned, the first storage area has an associated second storage area that stores corresponding user software associated with the software generated by the code generator stored in the first storage area. Consequently, a developer may store user software including modifications to associated machine-generated software stored in the second storage area. Based on the metadata, the code generator generates machine-generated software. The code generator stores the machine-generated software in the first storage area while preserving corresponding user software associated with machine-generated code stored in the second storage area. Because associated machine-generated software and user-generated software are stored in different storage areas (compared to storing different types of code in the same file according to conventional techniques), regeneration of software by the code generator is a simpler process because the code generator need not expend extra resources to avoid overwriting user modifications stored in the second storage area. In other words, the code generator need not parse contents of a file in an output directory to determine which portions of the file can be overwritten and which cannot.

In accordance with further embodiments, the code generator maintains the second storage area (e.g., modified_source directory) to include a hierarchical directory, at least portions of which are substantially similar in structure to another hierarchical directory associated with the first storage area (e.g, generated_source directory). In one application, a structure associated with the generated directory substantially mirrors a structure of the modified_source directory. This enables the code generator to more easily determine whether user software associated with machine-generated code is stored in the second storage area because the code generator need only look in similar branches of each directory to identify whether any corresponding user modifications exist for a given software.

As mentioned, the code generator generates machine-generated code (e.g., a set of software instructions) based on receipt of metadata. The metadata may include class dependency information and class property information at least partially defining attributes of a set of software instructions to be generated by the code generator. The metadata may also include source code, etc.

In addition to generating the machine-generated software code, the code generator identifies (or checks) whether the second storage area stores user generated software including a corresponding file of user modifications associated with the machine-generated software code. If so, the code generator overwrites a software file previously generated by the code generator in the first storage area with an updated software file generated by the code generator. The code generator names the updated software file stored in the first storage area with a unique name other than a name that would have been assigned to the updated software file if there were no corresponding file of user modifications in the second storage area. The unique name may include an indication that the updated software file is a base (e.g., a foundation) version of machine-generated software generated by the code generator for a particular class. For example, the updated software file may include the suffix "BASE" appended to an original name, which would otherwise be assigned as its name if there were no corresponding file of user modifications in the second storage area.

A user may be provided access to one or multiple files of user modifications stored in the second storage area. A given file of user modifications may include a reference (based on input from the user) to the unique name assigned to the machine-generated software stored in the first storage area. For example, an initial code build may include a machine-generated software Class_A.java in the first storage area. To implement user modifications to class A, the user may create a file (including user modifications to machine-generated code) named Class_A.java and store the file in the modified_source directory. During a following code generation process, the code generator generates software associated with class A and names the generated software a unique name such as Class_A_BASE, which is then stored in the generated_source directory. As noted above, because a user knows at a time of creating file of modifications A.java that the code generator will overwrite Class_A.java in the generated_source directory with Class_A_BASE.java on a next code build, the user modifies file Class_A.java in the modified_source directory to include a reference to the unique name Class_A_BASE file in the generated_source directory. Consequently, after the software rebuild by the code generator, the user written class (e.g, Class_A.java) in the modified_source directory derives from the machine-generated class (i.e., Class_A_BASE) based on use of the reference. The result is to insert the user-written class into a class hierarchy between the client and machine-generated implementation of the class.

Although embodiments of the invention are well-suited for supporting generation, storage, and general manipulation of Java files to support and exploit the aforementioned features, the inventive methods herein may be exploited using any object-oriented programming language.

Other embodiments of the invention include a computer system, computerized device, or other device configured with software and/or circuitry to process and perform all (or a portion thereof) of the method operations noted above and disclosed herein as embodiments of the invention. In such embodiments, the device comprises a memory unit (e.g., any type of computer readable medium, storage or memory system), a processor, and an interconnect mechanism connecting the processor and the memory unit. In such embodiments, at least a portion of the memory unit is encoded with an application that causes the computer system to perform any part and/or all of the method embodiments, steps and operations explained herein as embodiments of the invention. In other words, one or multiple computers that is programmed or otherwise configured to operate as explained herein is considered an embodiment of the invention.

One embodiment of the present invention is directed to a computer program product that includes a computer readable medium having instructions stored thereon for preserving code modifications as discussed herein. The instructions, when carried out by a processor, cause the processor to perform the operations of: i) utilizing a first storage area to store software generated by a code generator, the first storage area having an associated second storage area that stores corresponding user software associated with the software generated by the code generator stored in the first storage area; ii) operating the code generator to generate software based on receipt of metadata, the metadata at least partially defining attributes of a set of software instructions to be generated by the code generator; and iii) storing the set of software instructions generated by the code generator in the first storage area while preserving corresponding user software associated with the set of software instructions stored in the second storage area. Other embodiments of the invention disclosed herein include software programs to perform any of the method embodiment steps and operations summarized above and disclosed in detail below.

Embodiments of the invention may be implemented by computer software and/or hardware mechanisms within any type of computing apparatus. It is to be understood that the certain embodiments of the invention can be embodied strictly as a software program, as software and hardware, or as hardware and/or circuitry alone such as in a client or host computer device.

Figure 1:
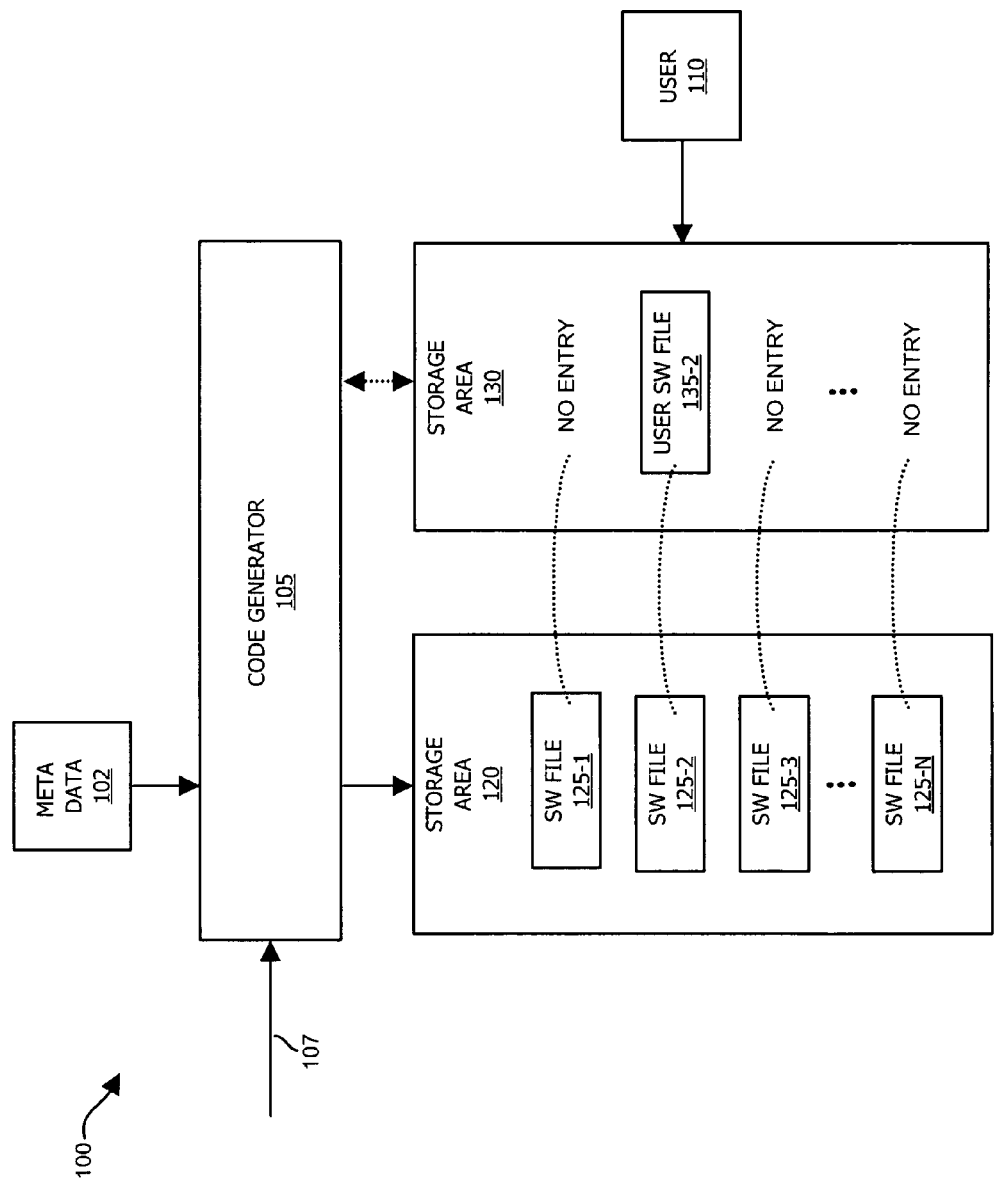
FIG. 1 is a block diagram of a code generator and respective storage areas to store machine-generated software and user-generated software according to an embodiment of the invention.

The foregoing and other objects, features and advantages of the invention will be apparent from the following more particular description of preferred embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Embodiments of the invention utilize a first storage area (e.g., a user directory such as a "generated_source" directory) to store software code generated by a code generator. A second storage area (e.g., a machine code directory such as a "modified_source" directory) stores user modifications (e.g., user software) associated with the software generated by the code generator stored in the first storage area. Generally, machine-generated software stored in the first storage area is overwritten each time the code generator is operated to create new or updated machine-generated software while user software in the second storage area is preserved so that user modifications are not overwritten.

As an example, during the code regeneration process of this invention, the code generator first checks the modified_source directory (i.e., the user code storage location) for a file (e.g., a Java or C++ class) with the same name as software presently being processed (i.e., generated) by the code generator. Based on metadata defining attributes of code to be generated, the code generator generates software associated with a given file such as file A. If there are no user modifications stored in the modified_source directory associated with file A, the code generator generates and stores file A (e.g., contains code for a particular class) with a file name and extension according to a standard convention. For example, the code generator stores file A as A.java in the generated_source directory without changing file name A to another name. On the other hand, if the modified_source directory (i.e., the user code storage location) contains software including modifications (e.g., a file having the name A.java) associated with file A, the code generator still generates the software code associated with file A but changes the name associated with the machine-generated software file (and associated class) A to be A_BASE.java (instead of A.java that the machine-generated software would otherwise be named if there were associated user modifications in modified_directory) for storage in the generated_source directory. Thus, in one embodiment of the invention, the code generator appends a well-known or identifiable suffix (e.g., "_BASE") to the file name (and class in the file) and places the machine-generated software (A_BASE.java) in the generated_source directory while preserving software (e.g., A.java) containing user modifications stored in the modified_source directory.

In further embodiments, the user written software (e.g., A.java stored in the modified_source directory) includes a reference so that A.java in the modified_source directory references or "extends" from the machine-generated software A_BASE.java stored in the generated_source directory. For example, the class file A.java in the modified_source directory may include a reference such as "Class A EXTENDS A_BASE." Inclusion of the "extends" reference ensures that a user-written software class such as A.java in the modified_source directory inherits from a corresponding machine-generated software class A_BASE.java stored in the generated_source directory. During subsequent regenerations of software, the code generator does not overwrite the user modified code because the code generator generates the renamed software (e.g., A_BASE.java) as described above, which may be protected from being modified by a user.

Accordingly, in the context of a code generator that generates dependent classes, clients utilizing the classes generated by the code generator instantiate classes based on use of the original file name such as A.java. The client application does not have to know whether that class is machine-generated or user-written because the client simply refers to the software as A.java, which may or may not include user generated software modifications. For example, if software modifications such as additional user created functions exist in the modified_source directory, then instantiated class A includes the user provided software modifications (i.e., the user created functions) in A.java as well as all of the machine-generated software in A_BASE.java stored in the generated_source directory. Consequently, a developer may implement changes in class A based on use of the user modification file A.java while reaping the benefit of incorporating any subsequent changes to class A from A_BASE.java as a result of updating machine-generated software associated with file A. In other words, subsequent changes to metadata may be used to implement changes to file A_BASE.java while preserving other modifications in file A.java. If no software modifications exist in the modified_source directory, then instantiated class A includes only the machine-generated software in A.java stored in the generated_source directory.

FIG. 1 is a block diagram of a code generation system 100 according to an embodiment of the invention. As shown, code generation system 100 includes metadata 102, code generator 105, storage area 120, storage area 130, and user 110. Storage area 120 stores software files 125-1, 125-2, 125-3, . . . , 125-N. Storage area 130 stores software file 135-2.

During general operation of code generation system 100, code generator 105 generates software files 125, which are stored in storage area 120. User 110 accesses storage area 130 to provide modifications to software stored in storage area 120. For example, user 110 may store modifications such as additions to software file 125-2 in user software file 135-2 by writing new functions and/or methods within the class of the software file 125-2. As shown, each of software files 125 may not have an associated user software file 135. In the present example, software file 125-2 has associated user software file 135-2 while software files 125-1, 125-3, and 125-N have no respective entries (of a user software file 135) in storage area 130. Further operation of code generator 105 will be discussed in relation to flowchart 200 in FIG. 2. As mentioned, the files can represent, for example, classes (e.g., C++ or Java) in which the file name is the name of a software class within the file. Thus, embodiments of the invention are well-suited in applications in which file names are required to be the same as class names because a compiler will find and compile source files for classes that are referenced in other sources being compiled.

Figure 2:
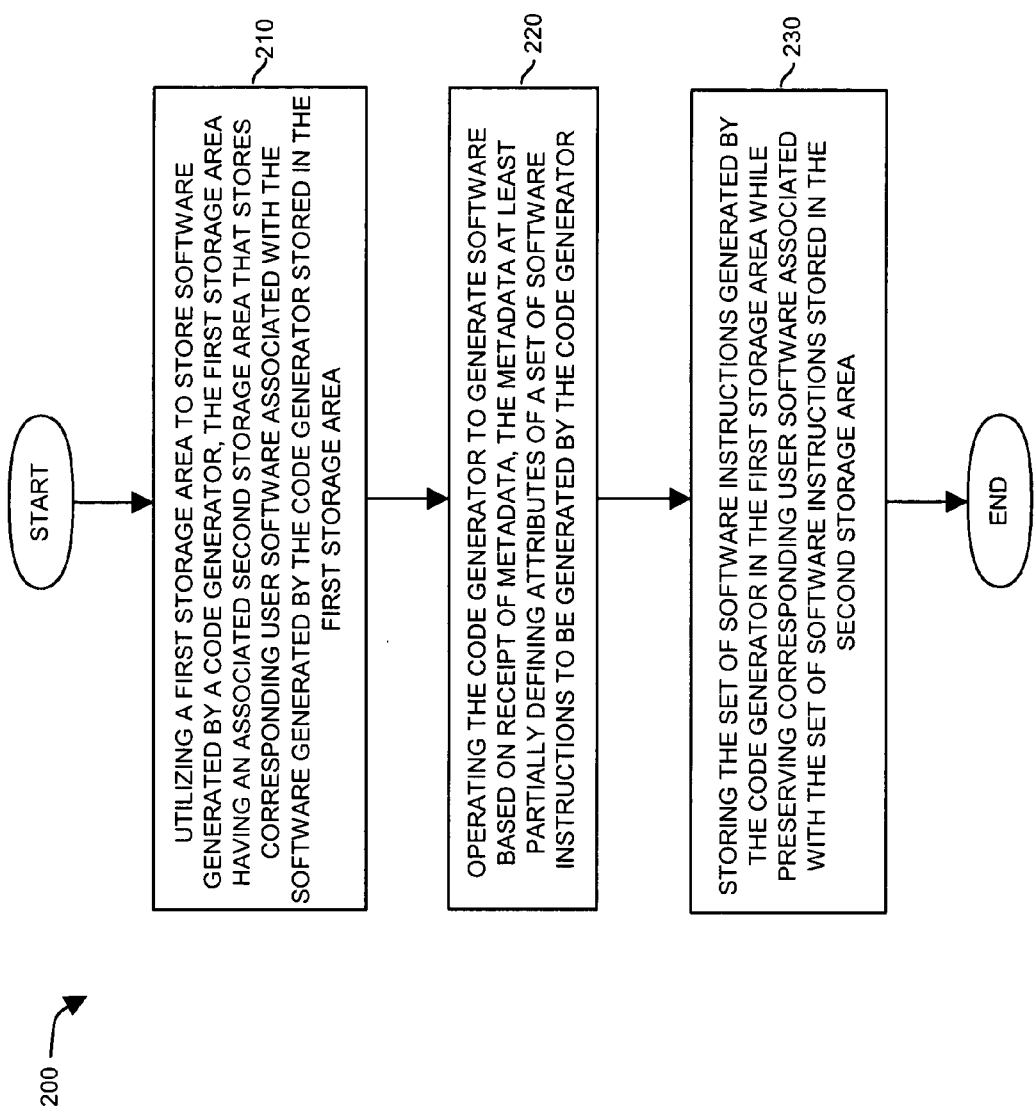
FIG. 2 is a flowchart of a technique for preserving a user's software modifications according to a general embodiment of the invention.

FIG. 2 is a flowchart 200 further illustrating general functionality of code generator 105 according to an embodiment of the invention.

In step 210, code generator 105 utilizes a first storage area 120 to store software (e.g., software files 125) generated by the code generator 105. The first storage area 120 has an associated second storage area 130 to store corresponding user software (e.g., user software file 135-2 including user modifications) associated with the software files 125. In the specific example as shown in FIG. 1, a user 110 stores user software file 135-2 including user modifications associated with software file 125-2 generated by code generator 105.

In step 220, receipt of code generation command 107 causes the code generator 105 to generate software code for storage in storage area 120 based on metadata 102. Metadata 102 at least partially defines attributes of a set of software instructions to be generated by the code generator 105. Among the files (e.g., updated versions of software files 125-1, 125-2, 125-3, . . . , 125-N) generated by code generator 105, code generator 105 generates an updated version of software file 125-2.

In step 230, the code generator 105 stores updated version of software file 125-2 (which is associated with user software file 135-2) generated by code generator 105 in storage area 120 while preserving (e.g., not overwriting) corresponding user software file 135-2 stored in the second storage area 130.

Because associated machine-generated software (e.g., software file 125-2) and user-generated software (e.g., user software file 135-2) are stored in different respective storage areas 120 and 130, regeneration of software by the code generator 105 is a simpler process than employed by conventional techniques that must identify which area in the same file to overwrite and which area to preserve user modifications. Thus, according to an embodiment the present invention, the code generator 105 need not allocate resources to identify which areas of a given file can be overwritten and which areas can not be overwritten by code generator 105. Instead, code generation system 100 prevents overwriting user modifications such as those in user software file 135-2 stored in the second storage area 130 because code generator 105 stores its machine-generated software in separate files such as software files 125 in storage area 120 while user software files 135 are stored in storage area 130. More specifically, unlike conventional methods, code generator 105 according to an embodiment of the invention checks whether there are any associated user software files 135 in storage area 130 during the code generation process.

Figure 3:
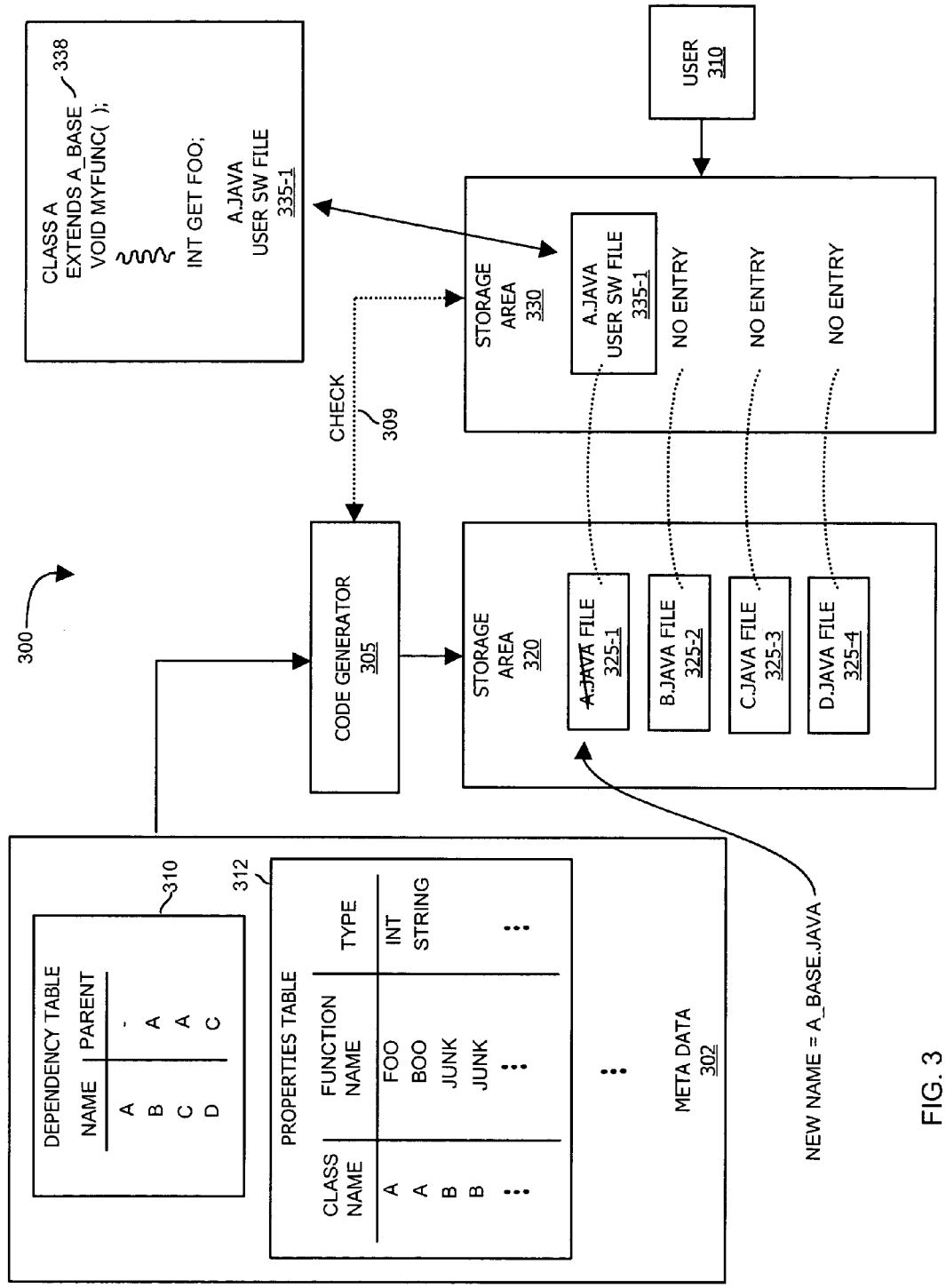
FIG. 3 is a more detailed diagram of a code generator and respective storage areas to store machine-generated software and user-generated software according to an embodiment of the invention.

FIG. 3 more particularly illustrates a code generation system 300 for generating software according to an embodiment of the invention. As shown, code generation system 300 includes similar elements as previously discussed in FIG. 1 as well as additional elements. For example, code generation system 300 includes metadata 302, code generator 305, storage area 320, storage area 330, and user 310. Storage area 320 stores software files 325-1, 325-2, . . . , 325-N. Storage area 330 stores user software file 335-1. Meta data 302 includes dependency table 310 and properties table 312 defining attributes of code to be generated by code generator 305.

In the example embodiment shown, code generator 305 generates software such as Java code (e.g., an object oriented programming language) for storage in storage area 320. As previously discussed, users (e.g., developers of the software code) provide modifications to code generated by code generator 305. For example, A.java is a user software file 335-1 including modifications associated with file 325-1. Note that metadata 302 may be modified to incorporate changes in software code. Thus, developers may modify attributes of produced code (e.g., Java source code) in two ways. First, code developers may provide user software files 335 including modifications associated with corresponding software files 325 in storage are 320. Second, code developers may edit or change the metadata 302 such as information in dependency table 310 and properties table 312 to implement code changes. The latter method of implementing changes in metadata 302 is cumulative with respect to any additional changes resulting from user modifications.

Note that it may not be possible for a code developer to implement appropriate changes to the machine-generated code by merely modifying metadata 302. Therefore, enabling a code developer to make modifications to software code via user software files 335 (e.g., hand-written modifications) provides increased flexibility to implement code changes that may be necessary for certain applications.

Figure 5:
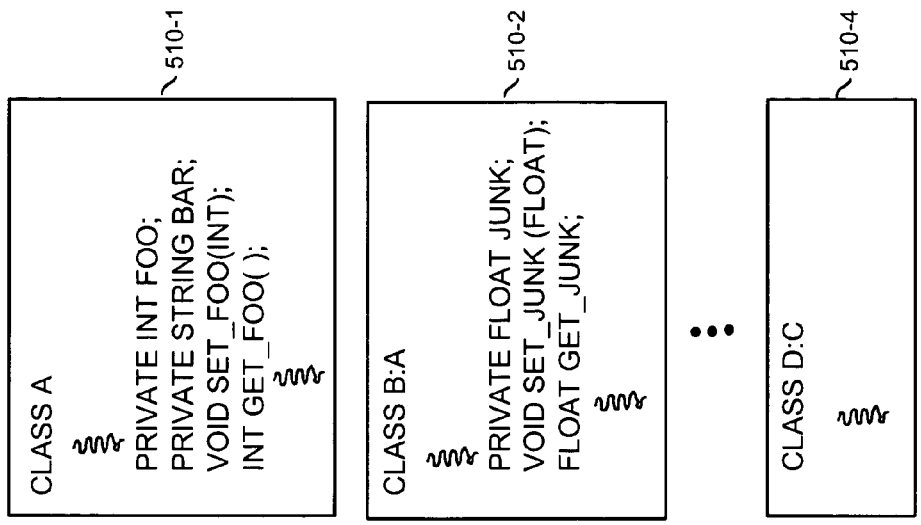
FIG. 5 is a diagram including a hierarchy of classes and corresponding code associated with the classes prior to providing user modifications to class A according to an embodiment of the invention.
Figure 5:
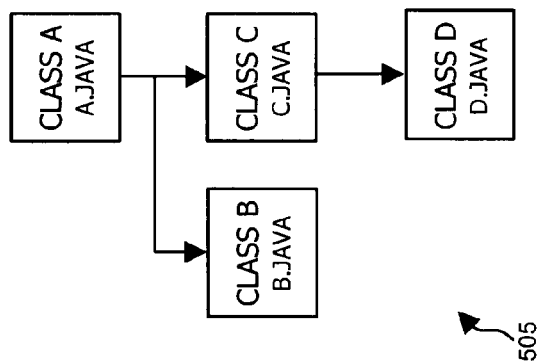

Assume on a first code build by code generator 305 that there are no user software files 335 stored in storage area 330. In this case, code generator 305 utilizes metadata 302 to generate related classes of software, namely, A.java file 325-1, B.java file 325-2, C.java file 325-3, D.java file 325-4. FIG. 5 illustrates class hierarchy 505 associated with classes and corresponding code 510-1, 510-2, 510-3, and 510-4 generated for respective classes A through D based on metadata 302.

Figure 6:
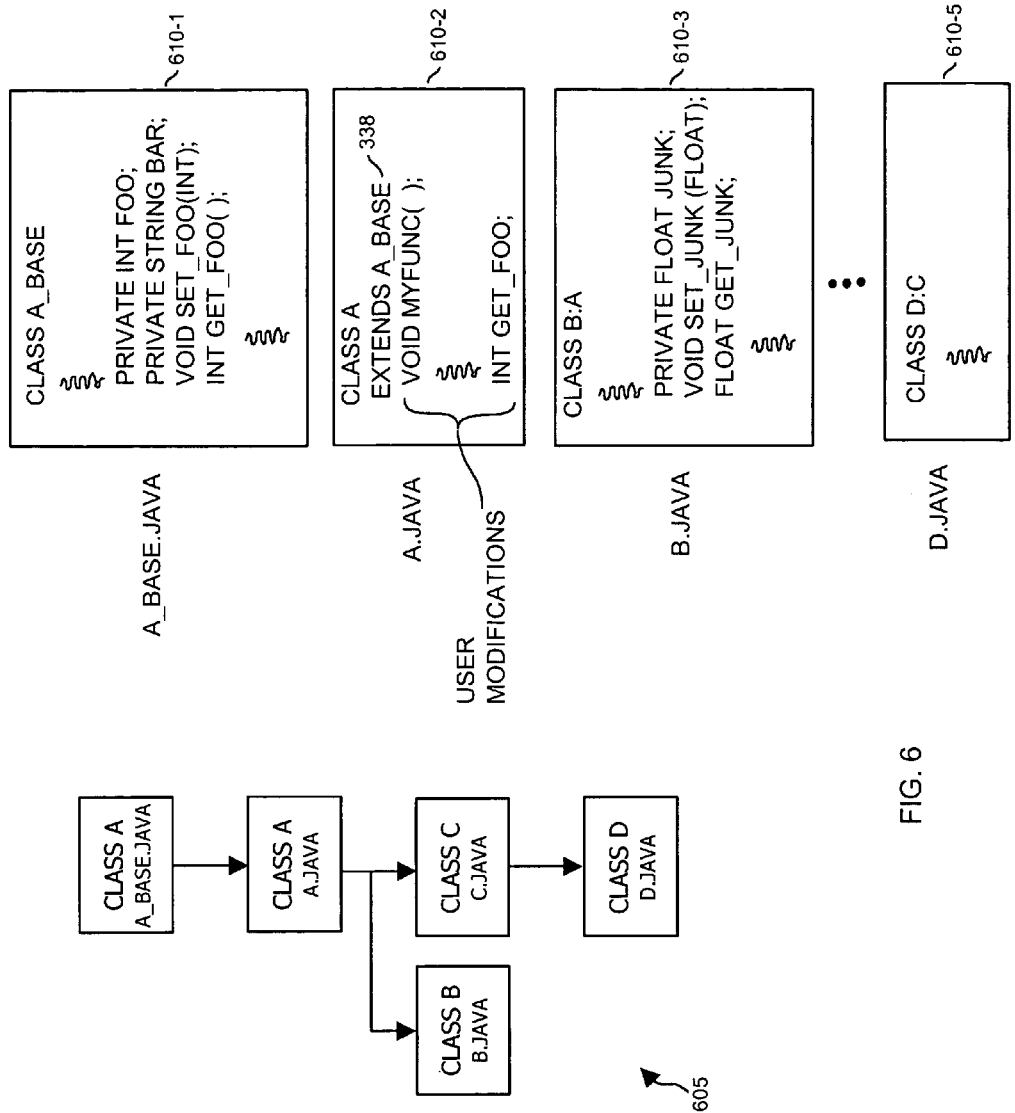
FIG. 6 is a diagram including a hierarchy of classes and corresponding code associated with classes after providing user modifications to class A according to an embodiment of the invention.

Referring again to FIG. 3, a code developer such as user 310, after the initial code build, generates user software file 335-1 including modifications associated with machine-generated class A software (i.e., file 325-1) stored in storage area 320. The code developer saves the user software file 335-1 with name A.java, which is the same name as that used by the code generator 305 to initially store software file 325-1 in storage area 320. The code developer includes a reference 338 in the user software file 335-1 identifying the name that the code generator 305 will assign machine-generated software associated with class A stored in storage area 320 on a next code build. For example, the developer knows on the next code build that code generator 305 will generate class A software stored in storage area 320 to have the name A_BASE.java instead of A.java because, during a following code build, code generator 305 will check 309 storage area 330 and identify that user software file 335-1 exists in storage area 330. As a result, code generator 305 renames software file 325-1 otherwise named A with the filename A_BASE. FIG. 6 illustrates class hierarchy 605 and corresponding code 610 generated for each of classes A through D based on metadata 302 and user modifications to class A software provided by user 310 via user software file 335-1.

Clients utilizing classes generated by the code generator 305 instantiate classes based on use of the original file name such as Class_A. The client application does not have to know whether that class is machine-generated or user-written because the client simply refers to Class_A, which includes user modifications (e.g., user software file 335-1) in storage area 330. For example, Class_A is instantiated by a client based on the user software modification (e.g., user software file 335-1) stored in storage area 330 which, based on reference 338, extends from corresponding A_BASE-.java stored in storage area 320. Thus, Class_A is defined by contents of A.java and A_BASE.java. Class_B in the present example does not include any modification stored in storage area 330. Consequently, Class_B is instantiated by a client based on B.java (i.e., software file 335-2) stored in storage area 320.

Figure 4:
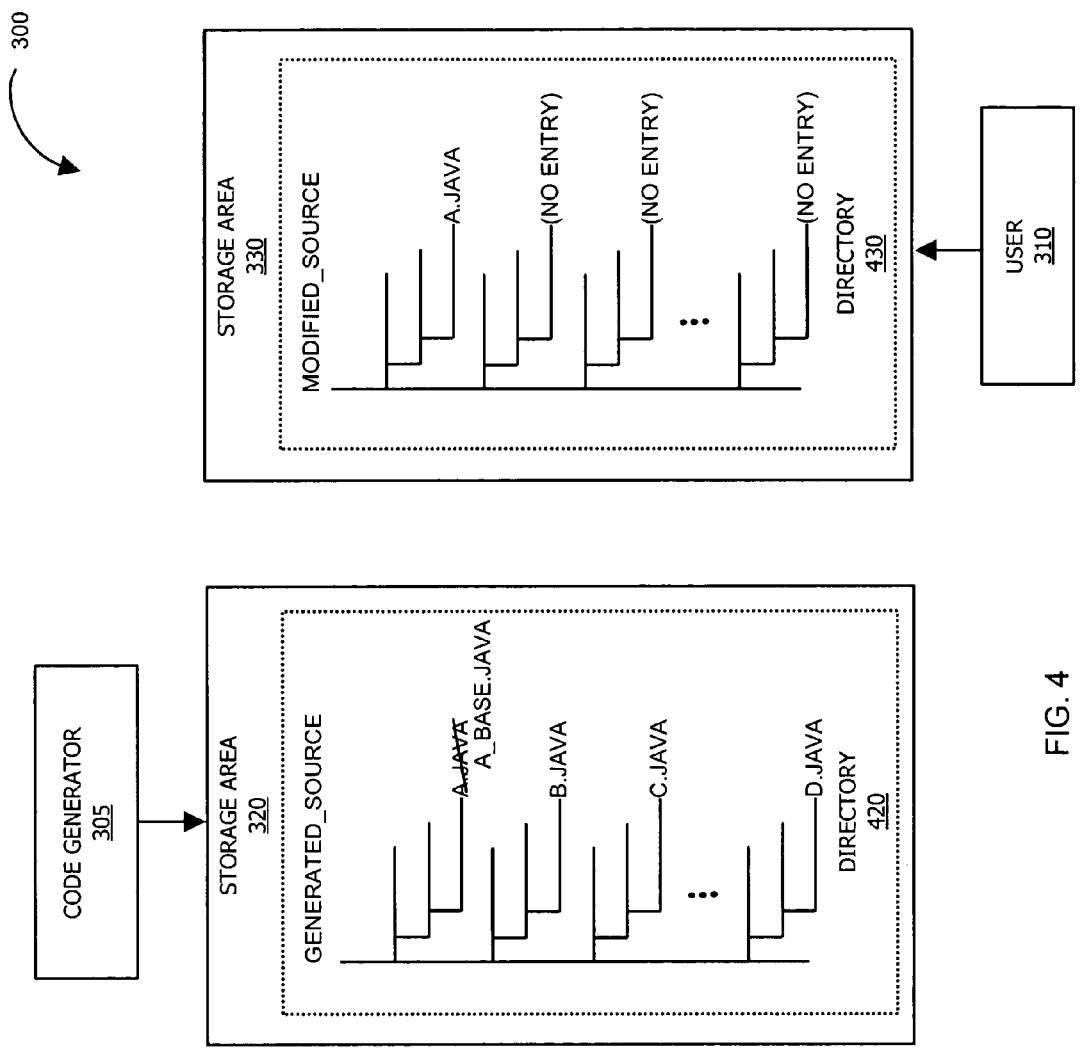
FIG. 4 is a diagram illustrating directories associated with respective storage areas that store machine-generated software and user-generated software according to an embodiment of the invention.

FIG. 4 is a block diagram of directories for storing software according to an embodiment of the invention. As shown, storage area 320 includes directory 420 for tracking and storing software files 325 generated by code generator 305. Storage area 330 includes directory 430 for tracking and storing user software files 335 generated by user 310.

In accordance with this example embodiment, code generation system 300 maintains storage area 330 to include a hierarchical directory 430 (e.g., modified_source directory), at least portions of which are substantially similar in structure to hierarchical directory 420 (e.g., generated_source directory) associated with the storage area 320. In one application, a structure associated with the directory 420 substantially mirrors a structure associated with directory 430. Thus, during generation of machine code, code generator 305 may quickly identify whether a user software file 335 is stored in storage area 330 for given software to be generated. For example, code generator 305 may search directory 420 for files with an _BASE suffix indicating that an associated user software file 335 is stored in storage area 330. Additionally, code generator 305 may search a corresponding branch in directory 430 to identify which, if any, associated user software files 335 exist in storage area 330 for given machine-generated code.

Figure 7:
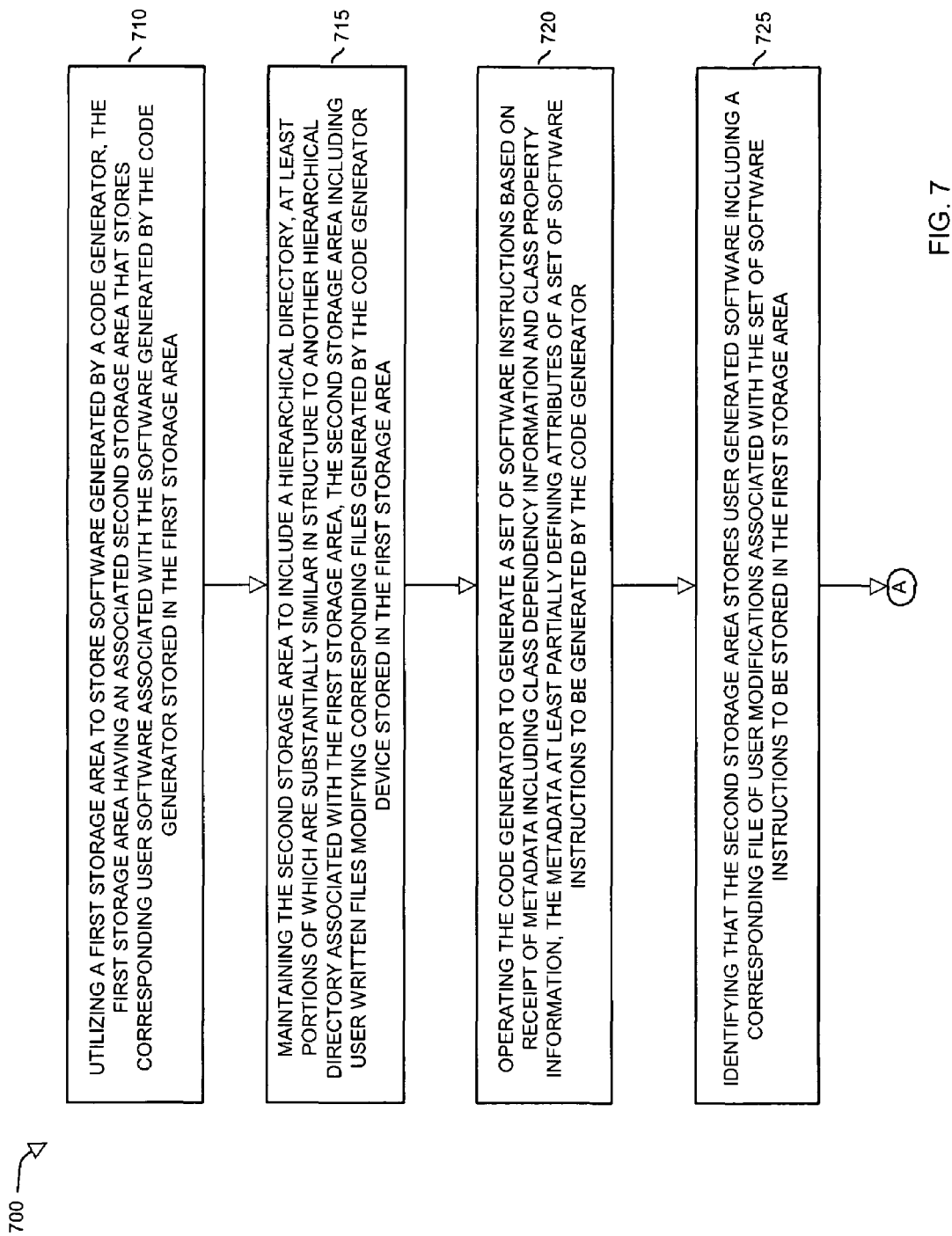
FIGS. 7 and 8 combine to form a flowchart illustrating a technique of maintaining names of software files in different directories according to an embodiment of the invention.
Figure 8:
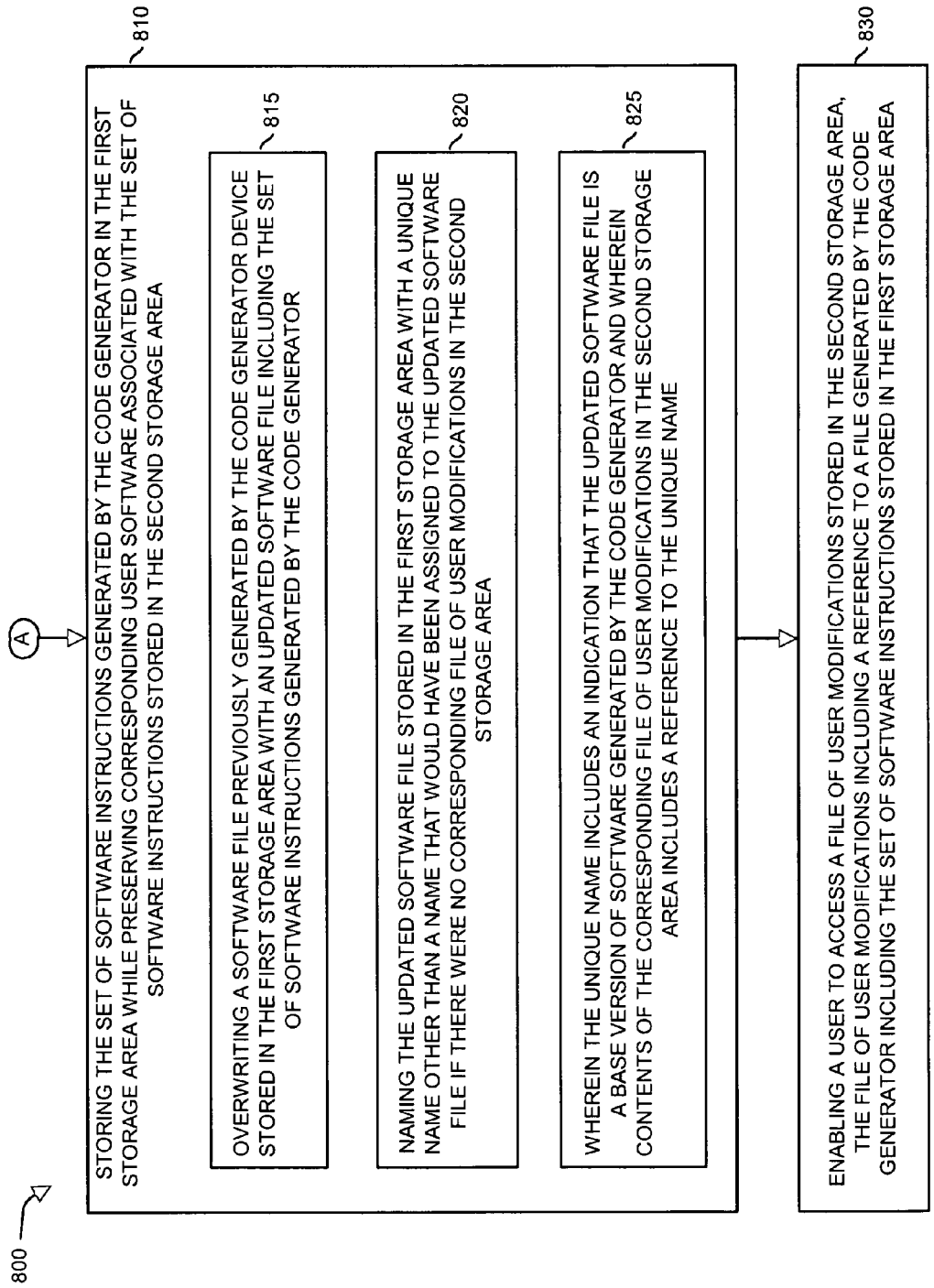

FIGS. 7 and 8 combine to form a flowchart for generating code according to an embodiment of the invention. Note that flowchart 200 in FIG. 2 discusses a general embodiment of the invention, whereas FIGS. 7 and 8 discuss a more detailed embodiment of the invention as previously discussed in relation to FIGS. 3-6. Thus, there is some overlap with respect to each of the embodiments.

In step 710 of flowchart 700, code generation system 300 utilizes storage area 320 to store software generated by code generator 305. As discussed, storage area 320 has an associated storage area 330 that stores corresponding user software files 335 associated with the software generated by the code generator 305.

In step 715, code generation system 300 maintains the storage area 320 to include a hierarchical directory 420, at least portions of which are substantially similar in structure to hierarchical directory 430 associated with storage area 330

In step 720, a developer (or other control mechanism) operates the code generator 305 to generate a set of software instructions based on receipt of metadata 302 in class dependency table 310 and class property table 312. The metadata 302 at least partially defines attributes of the a set of software instructions to be generated by the code generator 305.

In step 725, during a code build, the code generator 305 identifies (after check 309) that storage area 330 stores user software file 335-1 including corresponding user modifications associated with the set of software instructions.

In step 810 of flowchart 800 (FIG. 8), code generator 305 stores the set of software instructions generated by the code generator 305 (based on the metadata 302) in storage area 320 as software file 325-1 (A_BASE.java) while preserving corresponding user software file 335-1 (A.java) including modifications in storage area 330.

In step substep 815, code generator 305 overwrites a software file (e.g., A.java file 325-1) previously generated by the code generator 305 and stored in the storage area 320 with an updated software file (namely, A_BASE.java) including the set of software instructions presently generated by the code generator 305.

In substep 820, code generator 305 names the updated software file 325-1 with a unique name (e.g., A_BASE) other than a name (i.e., A) that would have been assigned to the updated software file 325-1 if there were no corresponding user software file 335-1 of user modifications in storage area 330.

In substep 825, the unique name (e.g., A_BASE) includes an indication (e.g., the _BASE portion of the name) that the updated software file is a "base" version of software generated by the code generator 305. Content of user software file 335-1 in the second storage area 330 includes reference 338 to the associated file of machine-generated software (e.g., software file 325-1) assigned and stored under the unique name A_BASE.

In step 830, code generation system 300 enables a user 310 to access user software file 335 of user modifications stored in storage area 330.

Accordingly, in the context of a code generation system in FIG. 3, a user 310 or developer may be provided access to one or multiple user software files 335 including modifications stored in the storage area 330. A given file such as user software file 335-1 includes a reference 338 (based on input from the user) to the unique name A_BASE assigned to the machine-generated software file 325-1 stored in storage area 330. For example, an initial code build by code generator 305 may produce machine-generated software A.java stored in storage area 320.

Further embodiments of the invention include a code generator 305 that, if the storage area 330 contains user software such as user software file 335-1, determines if the user software includes a reference 338 to a corresponding base version of software (e.g., A_BASE). If not, the code generator 305 may automatically modify the user software file 335-1 to include a reference 338 to the base version of software A_BASE. This provides an automated technique of ensuring that corresponding user software includes a proper reference to a base version of machine-generated software.

In another application, the code generator 305 determines whether storage area 330 includes corresponding user software files 335 associated with files 325. If not, the code generation system 300 or, more specifically, code generator 305 creates template software for a user to provide modification information. Such template software (initially not including any software functions) may already include an appropriate extension reference to a corresponding base version of software in storage area 320 in the non-user storage area 320. Thus, user 310 need not manually set up and create files for inputting user modifications. Instead, template software may be used to input user modifications.

In yet another application, code generator 305 performs a check during generation of software to identify whether a class (e.g., Class_A) associated with a base version of software (e.g., Class_A_BASE) includes a same function name as a function name in corresponding user software. If so, the code generator 305 provides notification to a user 310 indicating that a corresponding user software file 335 includes the same function name as a function name in the base version of software 325. Thus, a user 310 may be notified of an oversight that would otherwise result in the perpetuation of a software bug. Even in applications that do provide the notification function, one embodiment of the invention enables a user to replace a (potentially) defective system generated method with his own user generated method.

Figure 9:
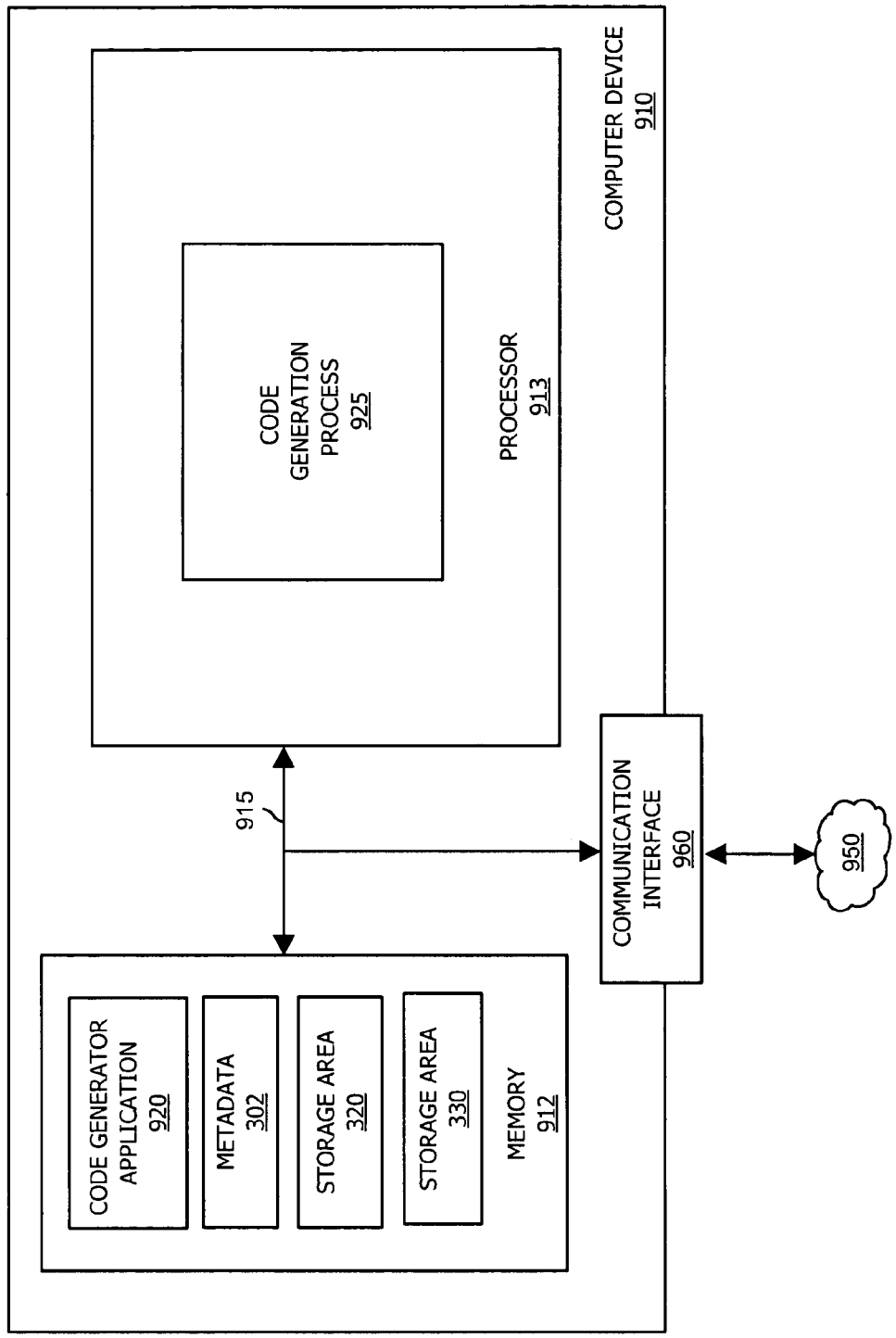
FIG. 9 is a diagram of a hardware platform supporting preservation of user software according to an embodiment of the invention.

FIG. 9 is a block diagram of a computer device 910 according to an embodiment of the invention. As shown, computer device 910 includes interconnect 915 such as a data bus or other circuitry interconnecting memory 912, processor 913, and communication interface 960. Processor 913 may be any type of central processing unit, microprocessor, processing device, controller of other electronic circuitry capable of accessing code generator application 920 to execute, run, interpret, or otherwise operate code generator application 920 to generate software code according to embodiments of the invention as explained herein. Memory 912 (e.g., disk storage, recording tape, memory chip, etc.) stores code generator application 920, as well as metadata 102, and includes storage areas 120 and 130 to store files as previously discussed. Communication interface 960 enables other computers such as clients to access generated code across network 950. Communication interface 960 also provides computer device 910 access to other resources over network 950 to support the generation of software code. Note that the elements comprising computer device 910 need not necessarily be co-located in a single computer device 910, but instead may be distributed with respect to each other.

In general, code generator application 920 in memory 912 represents software code, data and/or logic instructions executed by processor 913. When such code is executed, processor 913 creates code generator process 925 to retrieve metadata 102 and generate software code as discussed in relation to previous FIGS. 1 through 8.

Those skilled in the art will understand that there can be many variations made to the embodiments explained above while still achieving the same objective of those embodiments and the invention in general. The scope of this invention is intended to cover such variations. As such, the foregoing description of embodiments of the invention is not intended to be limiting.

What is claimed is:

1. A method supporting generation of software, the method comprising:
   utilizing a first storage area to store software generated by a code generator, the first storage area having an associated second storage area that stores corresponding user software associated with the software generated by the code generator stored in the first storage area;
   operating the code generator to generate software based on receipt of metadata, the metadata at least partially defining attributes of a set of software instructions to be generated by the code generator; and
   storing the set of software instructions generated by the code generator in the first storage area while preserving corresponding user software associated with the set of software instructions stored in the second storage area.

2. A method as in claim 1 further comprising:
   identifying that the second storage area stores user generated software including a corresponding file of user modifications associated with the set of software instructions to be stored in the first storage area; and
   wherein storing the set of software instructions includes overwriting a software file previously generated by the code generator device stored in the first storage area with an updated software file including the set of software instructions generated by the code generator.

3. A method as in claim 2, wherein overwriting the software file further involves:
   naming the updated software file stored in the first storage area with a unique name other than a name that would have been assigned to the updated software file if there were no corresponding file of user modifications in the second storage area.

4. A method as in claim 3, wherein the unique name includes an indication that the updated software file is a base version of software generated by the code generator.

5. A method as in claim 3, wherein contents of the corresponding file of user modifications in the second storage area includes a reference to the unique name.

6. A method as in claim 1, wherein the metadata includes tables of class dependency information and class property information at least partially defining attributes of the set of instructions to be produced by the code generator device, the method further comprising:
   operating the code generator device to produce the set of software instructions including at least one class based on the metadata retrieved from the tables.

7. A method as in claim 1 further comprising:
   enabling a user to access a file of user modifications stored in the second storage area, the file of user modifications including a reference to a file generated by the code generator including the set of software instructions stored in the first storage area.

8. A method as in claim 1 further comprising:
   maintaining the second storage area to include a hierarchical directory, at least portions of which are substantially similar in structure to another hierarchical directory associated with the first storage area, the second storage area including user written files modifying corresponding files generated by the code generator device that are stored in the first storage area.

9. A computer system supporting generation of software, the computer system comprising:
- a processor;
- a memory unit that stores instructions associated with an application executed by the processor; and
- an interconnect coupling the processor and the memory unit, the interconnect enabling the computer system to execute the application and support operations of:
  - utilizing a first storage area to store software generated by a code generator, the first storage area having an associated second storage area that stores corresponding user software associated with the software generated by the code generator stored in the first storage area;
  - operating the code generator to generate software based on receipt of metadata, the metadata at least partially defining attributes of a set of software instructions to be generated by the code generator; and
  - storing the set of software instructions generated by the code generator in the first storage area while preserving corresponding user software associated with the set of software instructions stored in the second storage area.

10. A computer system as in claim 9 that additionally supports operations of:
- identifying that the second storage area stores user generated software including a corresponding file of user modifications associated with the set of software instructions to be stored in the first storage area; and
- wherein storing the set of software instructions includes overwriting a software file previously generated by the code generator device stored in the first storage area with an updated software file including the set of software instructions generated by the code generator.

11. A computer system as in claim 10, wherein the operation of overwriting the software file further involves:
- naming the updated software file stored in the first storage area with a unique name other than a name that would have been assigned to the updated software file if there were no corresponding file of user modifications in the second storage area.

12. A computer system as in claim 11, wherein the unique name includes an indication that the updated software file is a base version of software generated by the code generator.

13. A computer system as in claim 11, wherein contents of the corresponding file of user modifications in the second storage area includes a reference to the unique name.

14. A computer system as in claim 9, wherein the metadata includes tables of class dependency information and class property information at least partially defining attributes of the set of instructions to be produced by the code generator device, the computer system additionally supporting an operation of:
- operating the code generator device to produce the set of software instructions including at least one class based on the metadata retrieved from the tables.

15. A computer system as in claim 9 that additionally supports operations of:
- enabling a user to access a file of user modifications stored in the second storage area, the file of user modifications including a reference to a file generated by the code generator including the set of software instructions stored in the first storage area.

16. A computer system as in claim 9 that additionally supports operations of:
- maintaining the second storage area to include a hierarchical directory, at least portions of which are substantially similar in structure to another hierarchical directory associated with the first storage area, the second storage area including user written files modifying corresponding files generated by the code generator device that are stored in the first storage area.

17. In a code generator, a method for producing software, the method comprising:
- receiving metadata at least partially defining attributes of a set of software instructions to be generated by the code generator;
- determining if a user storage area includes user software associated with software generated by the code generator based on the metadata, and if the user storage area includes the user software:
  - i) producing a base version of software including the set of software instructions based on the metadata; and
  - ii) storing the base version of software in a non-user storage area; and
- if the user storage area does not contain the user software:
  - i) producing a non-base version of software including the set of software instructions from the metadata; and
  - ii) storing the non-base version of software in the non-user storage area.

18. A method as in claim 17 further comprising:
- if the user storage area contains the user software, determining if the user software includes a reference to a corresponding base version of software, and, if not, modifying the user software to include a reference to the base version of software.

19. A method as in claim 17 further comprising:
- if the user storage area does not contain user software, creating template software for a user to provide modification information, the template software including an extension reference to the base version of software in the non-user storage area, the template software at least initially including no software functions.

20. A method as in claim 17 further comprising:
- during generation of software, identifying that a class associated with the base version of software includes a same function name as a function name in corresponding user software; and
- providing notification to a user indicating that the user software includes the same function name as a function name in the base version of software.

21. A method as in claim 17, wherein the metadata includes at least one of:
  - i) information stored in tables including class hierarchy information and class property information, and ii) source code information.

22. A method as in claim 17, wherein the user storage area and non-user storage area include at least portions of substantially similar hierarchical directories to store at least the base version of software and corresponding user software including preserved modifications when a corresponding base version of software is stored in the non-user storage area.

23. A method as in claim 17, wherein the base version of software includes a class generated by the code generator and corresponding user software includes preserved modifications to the class.

24. A method as in claim 17, wherein the user software includes modifications to the corresponding base version of software stored in the non-user storage area.

25. A computer system supporting generation of software, the computer system comprising:
- a processor;
- a memory unit that stores instructions associated with an application executed by the processor; and
- an interconnect coupling the processor and the memory unit, the interconnect enabling the computer system to execute the application and support operations of:
  - receiving metadata at least partially defining attributes of a set of software instructions to be generated by the code generator;
  - determining if a user storage area includes user software associated with software generated by the code generator based on the metadata, and
  - if the user storage area includes the user software:
    - i) producing a base version of software including the set of software instructions based on the metadata; and
    - ii) storing the base version of software in a non-user storage area; and
  - if the user storage area does not contain the user software:
    - i) producing a non-base version of software including the set of software instructions from the metadata; and
    - ii) storing the non-base version of software in the non-user storage area.

26. A computer system as in claim 25 that additionally supports operations of:
- if the user storage area contains the user software, determining if the user software includes a reference to a corresponding base version of software, and, if not, modifying the user software to include a reference to the base version of software.

27. A computer system as in claim 25 that additionally supports operations of:
- if the user storage area does not contain user software, creating template software for a user to provide modification information, the template software including an extension reference to the base version of software in the non-user storage area, the template software at least initially including no software functions.

28. A computer system as in claim 25 that additionally supports operations of:
- during generation of software, identifying that a class associated with the base version of software includes a same function name as a function name in corresponding user software; and
- providing notification to a user indicating that the user software includes the same function name as a function name in the base version of software.

29. A computer system as in claim 25, wherein the metadata includes at least one of:
- i) information stored in tables including class hierarchy information and class property information, and ii) source code information.

30. A computer system as in claim 25, wherein the user storage area and non-user storage area include at least portions of substantially similar hierarchical directories to store at least the base version of software and corresponding user software including preserved modifications when a corresponding base version of software is stored in the non-user storage area.

31. A computer system as in claim 25, wherein the base version of software includes a class generated by the code generator and corresponding user software includes preserved modifications to the class.

32. A computer system as in claim 25, wherein the user software includes modifications to the corresponding base version of software stored in the non-user storage area.

33. A computer program product including a computer-readable medium having instructions stored thereon for processing data information, such that the instructions, when carried out by a processing device, enable the processing device to perform operations of:
- utilizing a first storage area to store software generated by a code generator, the first storage area having an associated second storage area that stores corresponding user software associated with the software generated by the code generator stored in the first storage area;
- operating the code generator to generate software based on receipt of metadata, the metadata at least partially defining attributes of a set of software instructions to be generated by the code generator; and
- storing the set of software instructions generated by the code generator in the first storage area while preserving corresponding user software associated with the set of software instructions stored in the second storage area.

34. A computer system that supports preservation of software modifications, the computer system comprising:
- means for utilizing a first storage area to store software generated by a code generator, the first storage area having an associated second storage area that stores corresponding user software associated with the software generated by the code generator stored in the first storage area;
- means for operating the code generator to generate software based on receipt of metadata, the metadata at least partially defining attributes of a set of software instructions to be generated by the code generator; and
- means for storing the set of software instructions generated by the code generator in the first storage area while preserving corresponding user software associated with the set of software instructions stored in the second storage area.

* * * * *